United States Patent
Wang et al.

(10) Patent No.: US 10,530,236 B2
(45) Date of Patent: Jan. 7, 2020

(54) AUXILIARY POWER SUPPLY FOR A GATE DRIVER

(71) Applicant: Ohio State Innovation Foundation, Columbus, OH (US)

(72) Inventors: Jin Wang, Powell, OH (US); Boxue Hu, Columbus, OH (US); He Li, Columbus, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 0 days.

(21) Appl. No.: 16/131,630

(22) Filed: Sep. 14, 2018

(65) Prior Publication Data

US 2019/0089237 A1    Mar. 21, 2019

Related U.S. Application Data

(60) Provisional application No. 62/559,521, filed on Sep. 16, 2017.

(51) Int. Cl.
*H02M 1/08* (2006.01)
*H02M 3/06* (2006.01)
*H02M 3/158* (2006.01)
*H02M 3/335* (2006.01)
*H02M 1/36* (2007.01)

(52) U.S. Cl.
CPC ............. *H02M 1/08* (2013.01); *H02M 3/158* (2013.01); *H02M 3/33569* (2013.01); *H02M 1/36* (2013.01)

(58) Field of Classification Search
CPC .......... H02M 1/08; H02M 3/06; H02M 3/158; H02M 3/3353; H02M 3/33569
USPC .......................... 327/530, 538, 540, 541, 543
See application file for complete search history.

(56) References Cited

U.S. PATENT DOCUMENTS

| | | | |
|---|---|---|---|
| 2012/0025736 A1* | 2/2012 | Singh .................... | H02M 3/156 315/307 |
| 2016/0141964 A1* | 5/2016 | Yu ..................... | H02M 3/33507 363/21.02 |

* cited by examiner

*Primary Examiner* — William Hernandez
(74) *Attorney, Agent, or Firm* — Benesch, Friedlander, Coplan & Aronoff LLP

(57) ABSTRACT

The present disclosure relates to an auxiliary power supply (APS) for a gate driver in high voltage applications.

20 Claims, 6 Drawing Sheets

AUXILIARY POWER SUPPLY FOR A GATE DRIVER

CROSS-REFERENCE TO RELATED APPLICATION

This application claims the benefit of U.S. Provisional Patent Application No. 62/559,521, filed Sep. 16, 2017, the entire contents of which are incorporated herein by reference.

TECHNICAL FIELD

This disclosure generally relates to systems and methods for providing power to gate drivers. Namely, this disclosure relates to an auxiliary power supply for one or more gate drivers.

BACKGROUND

Auxiliary power supplies can be used to provide electric power to controllers, switch gate driving circuits and/or sensors of power electronic converters. In high voltage applications, these devices can be used to drive a gate drive circuit. Examples of high voltage systems that utilize auxiliary power supplies include high voltage direct current (HVDC) transmission systems, flexible alternating current transmission systems (FACTS), static synchronous compensator (STATCOM) systems, motor drive systems, and the like. For these high voltage systems, multi-level converters with cascaded structures, such as a modular multi-level converter (MMC) system or a cascaded multi-level inverter system, have become desirable.

MMC systems, or also known as Chain-Link Converter (CLC) systems, include a plurality of converter cells, or converter sub-modules, that can be serially connected in converter branches, or phase legs, that in turn can be arranged in a wye/star, delta, and/or indirect converter topology. Each converter sub-module can include a half-bridge or a full-bridge circuit, and a capacitor. Each of the half-bridge or full-bridge circuits can include switching devices such as insulated-gate bipolar transistors (IGBTs), gate-turn-off thyristors (IGCTs), and metal-oxide-semiconductor field-effect transistors (MOSFETs), or the like. Each converter sub-module of the MMC system can be coupled to a separate gate drive system. Each gate drive system can include a gate driver (e.g., an amplifier) and a corresponding auxiliary power supply. The gate driver can be configured to drive the switching device based on an output voltage generated by the corresponding auxiliary power supply.

SUMMARY

Systems and methods are described herein for providing power to gate drivers.

In an example, an auxiliary power supply (APS) can include an upper arm circuit that can have an upper arm circuit impedance. The APS can further include a lower arm circuit that can include an isolated converter circuit and a voltage regulator circuit that can have respective impedances. The isolated converter circuit can be configured to generate an output voltage based on a lower arm voltage for a gate drive circuit. The lower arm voltage can be generated based on an input voltage applied to the upper arm circuit and the lower arm circuit. The lower arm voltage regulator can be configured to regulate a voltage level of the lower arm voltage based on an impedance ratio between the upper arm circuit impedance and an equivalent impedance of the lower arm circuit to substantially match a voltage level of a lower arm reference voltage.

In another example, an auxiliary power supply (APS) can include an upper arm circuit that can have an upper arm circuit impedance and a lower arm circuit that can have a lower arm circuit impedance. The upper arm circuit and the lower arm circuit can be connected in series. The lower arm circuit can be configured to generate an output voltage based on a lower arm voltage. The lower arm voltage can be generated based on an input voltage applied to the upper arm circuit and the lower arm circuit. The lower arm voltage can be regulated based on an impedance ratio between the upper arm circuit impedance and the lower arm circuit impedance to substantially match a voltage level of a lower arm reference voltage.

This Summary is provided merely for purposes of summarizing some example embodiments to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages of various disclosed embodiments will become apparent from the following detailed description taken in conjunction with the accompanying drawings which illustrate, by way of example, the principles of the described embodiments.

BRIEF DESCRIPTION OF THE DRAWINGS

Features, objects and advantages other than those set forth above will become more readily apparent when consideration is given to the detailed description below. Such detailed description makes reference to the following drawings.

DETAILED DESCRIPTION

Currently, two different types of topologies are being utilized to provide gate drive voltages for converter sub-modules: a centralized auxiliary power supply topology and a localized auxiliary power supply topology. In either configuration, auxiliary power supplies are configured with insulation capabilities such that a switching performance of relatively low voltage rated switching devices used in the converter sub-modules (e.g., switching devices that are rated for about 3 kilovolts (kV) or less) is not substantially impeded. However, with the emergence of high voltage rated switching devices (e.g., 10 kV or higher), and the need to incorporate these devices into high voltage systems for their benefits, advantages, and to meet increasing power demand requirements, conventional auxiliary power systems and their topologies fail to provide the required insulation capability for these devices. Auxiliary power supply solutions have been designed to accommodate for high voltage rated switching devices in high voltage systems. However, these attempts are cost-prohibitive, require excessive circuitry and control schemes, which complicates and reduces a reliability of existing auxiliary power supplies.

Systems and methods are described herein for driving switching devices being used in high voltage systems. An auxiliary power supply (APS) can be configured to generate an output voltage for each gate driver. Each gate drive circuit can be configured to generate a gate drive voltage to drive a respective switching device based on the output voltage. In some examples, each switching device can be part of (or form part of) a high voltage system. Additionally, or alternatively, in some examples, each switching device can be part of a corresponding converter sub-module of a modular multi-level converter (MMC) system.

Figure 1:
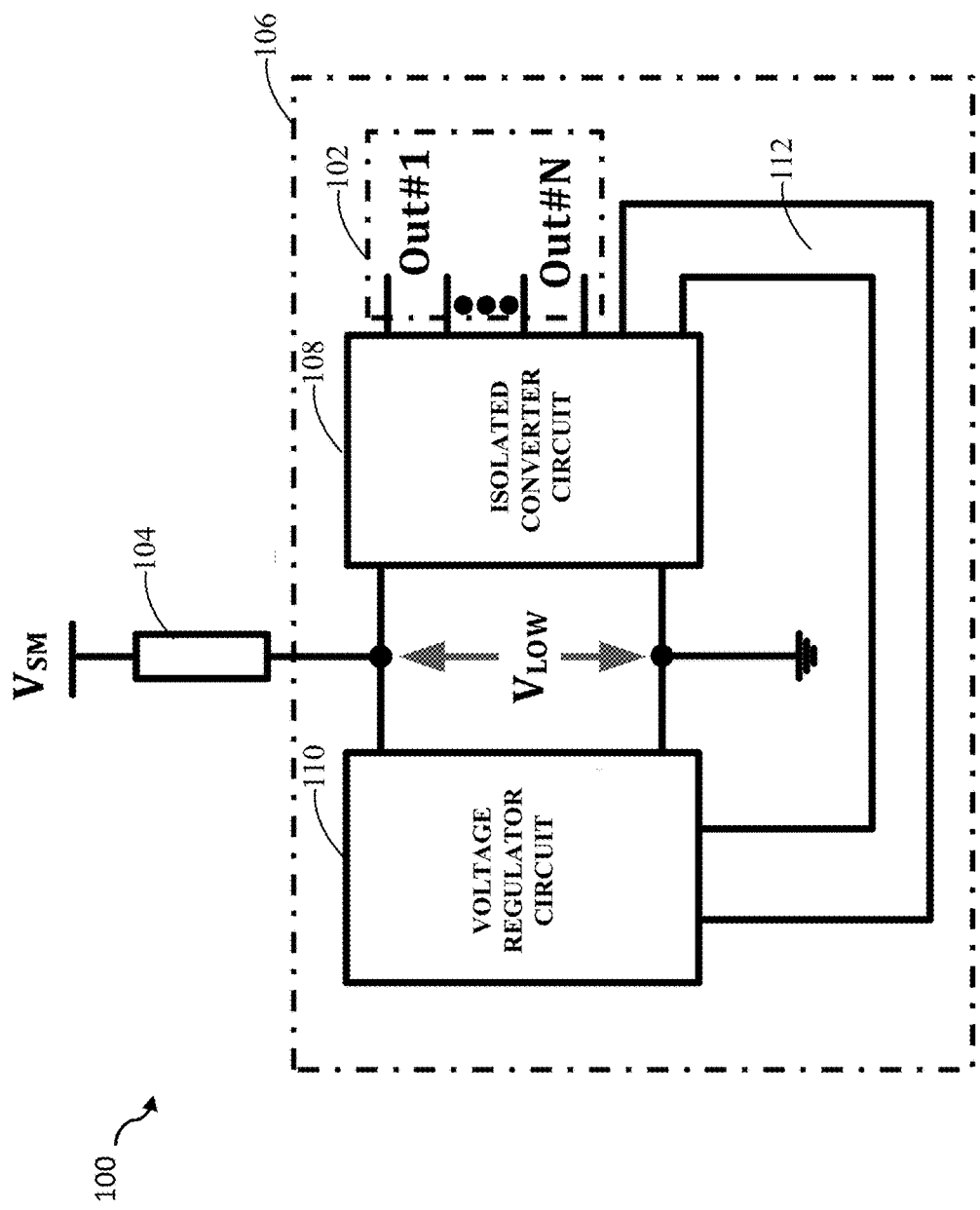
FIG. 1 depicts an example of an auxiliary power supply.

FIG. 1 depicts an example of an auxiliary power supply (APS) 100. The APS 100 can be configured to generate an output voltage at an output node 102 (e.g., Out#1, as illustrated in FIG. 1). In some examples, the output voltage can have a given voltage (e.g., about 10 Volts (V), and a corresponding output power (e.g., about 10 Watts (W)). A gate driver can be coupled to an output node 102 (not shown in FIG. 1). In some examples, the APS 100 can be configured to generate a plurality of output voltages at corresponding output nodes 102 to which a respective gate driver can be coupled. FIG. 1 illustrates an example of an APS 100 configured with a plurality of output nodes 102, wherein N represents a number of output terminals 102. However, in other examples, the APS 100 can be configured with any number of output nodes 102. For example, the APS can be configured with a single output node 102.

Each gate driver can be configured to generate a gate drive voltage based on a respective output voltage. The gate drive voltage can be applied to an associated switching device to drive the device consistent with the devices operating parameters. In some examples, the switching device can be part of or form part of a high-voltage system. Examples of high-voltage systems can include, but not limited to, high voltage direct current (HVDC) transmission systems, flexible alternating current transmission system (FACTS), static synchronous compensator (STATCOM) systems, medium voltage motor drives, and the like. Additionally, or alternatively, the switching device can correspond to a high voltage rated switching device (e.g., about 10 kilovolts (kV) or higher rate device). Examples of high voltage rated switching devices can include, but not limited to, Silicon Carbide (SiC) metal-oxide-semiconductor field-effect transistors (MOSFETs), SiC insulated-gate bipolar transistors (IGBTs), or the like. These devices can provide high voltage blocking capability, low conduction losses (e.g., low on-state resistances), and can substantially improve switching performance in comparison to lower voltage rated switching devices (e.g., about 3 kV or less).

The APS 100 can include an upper arm circuit 104 and a lower arm circuit 106. In some examples, the upper arm circuit 104 and the lower arm circuit 106 can be connected in series to define a voltage divider. An input voltage can be applied across the upper arm circuit 104 and the lower arm circuit 106. In a non-limiting example, the input voltage can be about 7 kV. The input voltage can be generated by a voltage source $V_{SM}$. In an example, the voltage source $V_{SM}$ can correspond to a local voltage source, such as a voltage source of the high voltage system as described herein. In some examples, the voltage source $V_{SM}$ can correspond to a direct-current (DC) bus of a converter sub-module of a MMC system. The upper arm circuit 104 can include a resistor, a capacitor, or a combination thereof. Thus, the upper arm circuit 104 can have an upper arm impedance. In some examples, the upper arm impedance can be fixed (e.g., non-variable).

The lower arm circuit 106 can include an isolated converter circuit 108. The isolated converter circuit 108 can be configured to generate one or more output voltages (e.g., about 15 V, about 300 V, etc.) based on a lower arm voltage $V_{LOW}$. The lower arm voltage $V_{LOW}$ can be established based on the input voltage and an impedance ratio. The impedance ratio can correspond to a ratio of an impedance between the upper arm 104 and an equivalent impedance. The equivalent impedance can characterize an impedance of the isolated converter circuit 108 and a voltage regulator circuit 110 of the APS 100. Accordingly, the lower arm voltage $V_{LOW}$ can be established based on the input voltage and the impedance ratio characterizing an overall impedance of the lower arm 106.

The lower arm 106 can include a feedback circuit 112. In some examples, the power at the output node 102 can be sensed and provided via the feedback circuit 112 to the voltage regulator 110. The feedback circuit 112 can include an electrical medium (e.g., a transmission line, traces, wires, or the like). In some examples, the voltage regulator circuit 110 can include a sensing circuit (not shown in FIG. 1). The sensing circuit can be configured to sense the lower arm voltage $V_{LOW}$. In an example, the sensed lower arm voltage can be a fraction of the lower arm voltage. In some examples, the sensing circuit can include a resistor network that can be configured to sense to the lower arm voltage $V_{LOW}$. In other examples, any sensing circuit can be used to sense the lower arm voltage $V_{LOW}$. The voltage regulator circuit 110 can be configured to adjust the lower arm voltage $V_{LOW}$ based on changes in operating conditions of the high voltage system (e.g., gate drive power variations). The voltage regulator circuit 110 can be configured to adjust the lower arm voltage $V_{LOW}$ based on the power at the output node 102.

Changes in operating conditions of the high voltage system can cause a change in the impedance of the isolated converter circuit 108. Changes in impedance of the isolated converter circuit 108 can be correlated with changes in operating conditions of the high voltage system. The lower arm voltage $V_{LOW}$ at an instance of time can provide an indication of impedance change in the isolated converter circuit 108. For example, an increase in the lower arm voltage $V_{LOW}$ can correspond to an increase in impedance of the isolated converter circuit 108. In other examples, a decrease in the lower arm voltage $V_{LOW}$ can correspond to a decrease in impedance of the isolated converter circuit 108.

While the APS 100 is operating, the voltage regulator circuit 110 can be configured to regulate the lower arm voltage $V_{LOW}$ across the isolated converter circuit 108 based on a sensed lower arm voltage. The voltage regulator 110 can be configured to maintain the lower arm voltage $V_{LOW}$ at a defined voltage level (e.g., within a given percentage (or voltage range) of a lower arm reference voltage $V_{REF}$ while the isolated converter circuit impedance is varying based on changes associated with the high voltage system. The voltage regulator 110 can be configured to dynamically adjust the lower arm voltage $V_{LOW}$ to substantially match the lower arm voltage reference $V_{REF}$ (e.g., within a given percentage (or voltage range) to reduce or eliminate the influence of the high voltage system on the APS 100.

In some examples, the voltage regulator circuit 110 can be configured to evaluate the sensed lower arm voltage relative to the lower arm reference voltage $V_{REF}$. The voltage regulator 110 can be configured to adjust a voltage level of the lower arm voltage $V_{LOW}$ based on the evaluation. For example, the voltage regulator circuit 110 can be configured to compare the sensed lower arm voltage to the lower arm reference voltage $V_{REF}$. The voltage regulator circuit 110 can be configured to one of increase and decrease the voltage level of the lower arm voltage $V_{LOW}$ based on a result of the comparison. Consequently, the impedance of the isolated converter circuit 108 can be one of increased and decreased based on the result of the comparison. Accordingly, the voltage regulator circuit 110 can be configured to adjust the voltage level of the lower arm voltage $V_{LOW}$ to match (or substantially match) the lower arm voltage reference $V_{REF}$. By regulating the lower arm voltage $V_{LOW}$, the APS 100 can be configured to provide a stable output voltage at the output node. The gate driver coupled to the output node 102 can be configured to drive a corresponding switching device in the high voltage system based on the stable output voltage.

Figure 2:
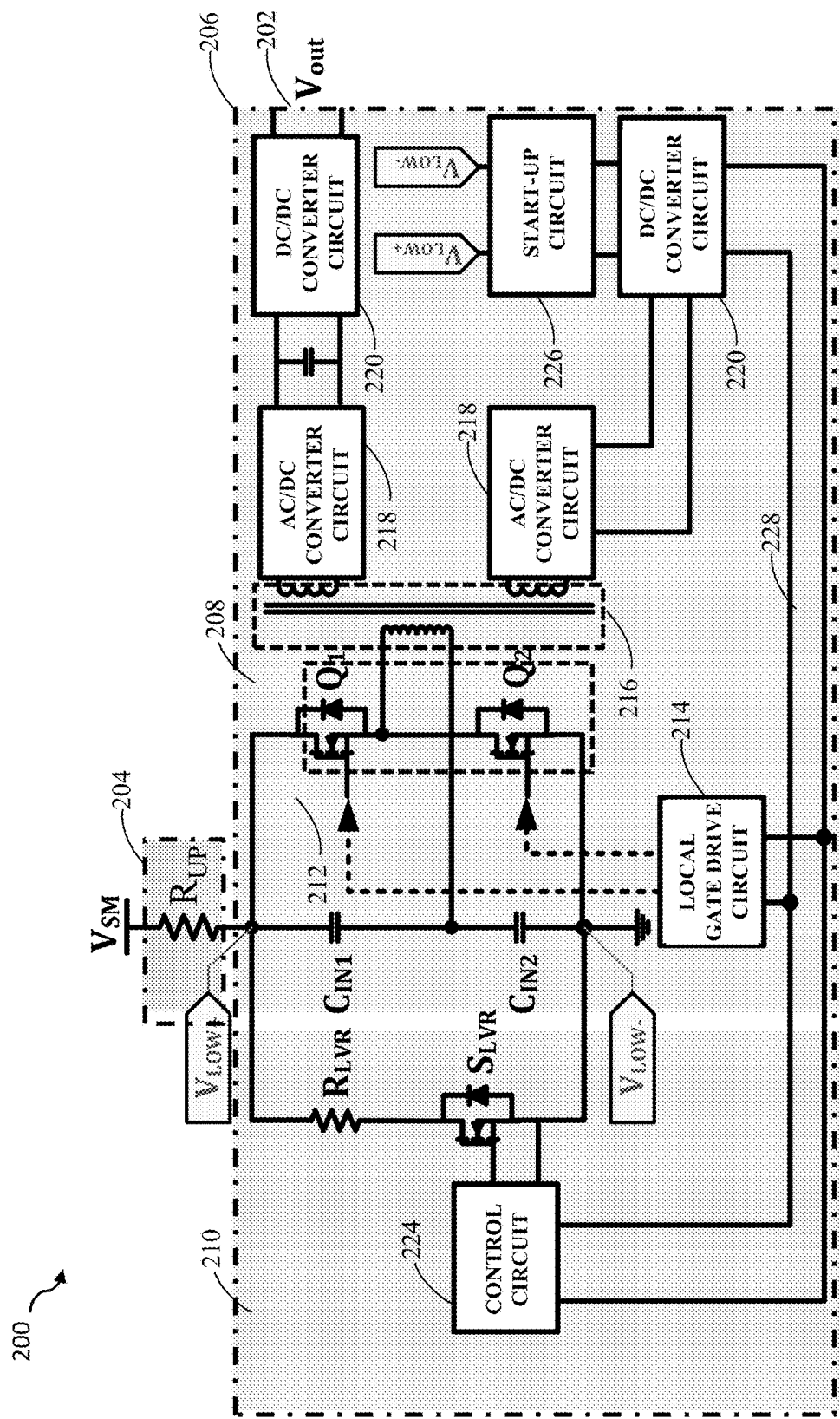
FIG. 2 depicts another example of an auxiliary power supply.

FIG. 2 illustrates another example of an auxiliary power supply (APS) 200. In some examples, the APS 200 can correspond to the APS 100, as illustrated in FIG. 1. The APS 200 can be configured to generate an output voltage $V_{out}$ at an output node 202. In some examples, the output node 202 can correspond to the output node 102, as illustrated in FIG. 1. A gate driver can be coupled to the output 202 (not shown in FIG. 2). The gate driver can be configured to drive a switching device according to device driver parameters based on the output voltage $V_{out}$. In some examples, the switching device can be part of or form part of a high voltage system, for example, an MMC system. In an example, a sub-module of the MMC system can include the switching device. In some examples, the switching device can correspond to a high voltage rated switching device, as described herein. In operation, the APS 200 can be configured to maintain a lower arm voltage at a defined voltage level (e.g., within a given range (or percentage) of a lower arm reference voltage) such that the switching device can be driven according to its switching requirements. Thus, the APS 200 can be configured to generate a stable output voltage $V_{out}$ at the output node 202 for driving the switching device in the high voltage system.

The APS 200 can include an upper arm circuit 204 and a lower arm circuit 206. In some examples, the upper arm circuit 204 can correspond to the upper arm circuit 104, as illustrated in FIG. 1, and the lower arm circuit 206 can correspond to the lower arm circuit 106, as illustrated in FIG. 1. The upper arm circuit 204 and the lower arm circuit 206 can be connected in series to define a voltage divider. An input voltage can be applied across the upper arm circuit 204 and the lower arm circuit 206. The input voltage can be generated by a voltage source $V_{SM}$. In some examples, the voltage source $V_{SM}$ can correspond to a DC bus (e.g., a DC bus of a converter sub-module of the high voltage system). In an example, the upper arm circuit 204 can include an upper arm resistor $R_{UP}$. In an another example, the upper arm circuit 204 can include the upper arm resistor $R_{UP}$ and a capacitor $C_{UP}$ (not shown in FIG. 2). The upper arm circuit 204 can have a fixed impedance (e.g., a non-varying impedance). In a non-limiting example, the upper arm resistor $R^{UP}$ can be about 608 kilo-ohms (kΩ).

Figure 3:
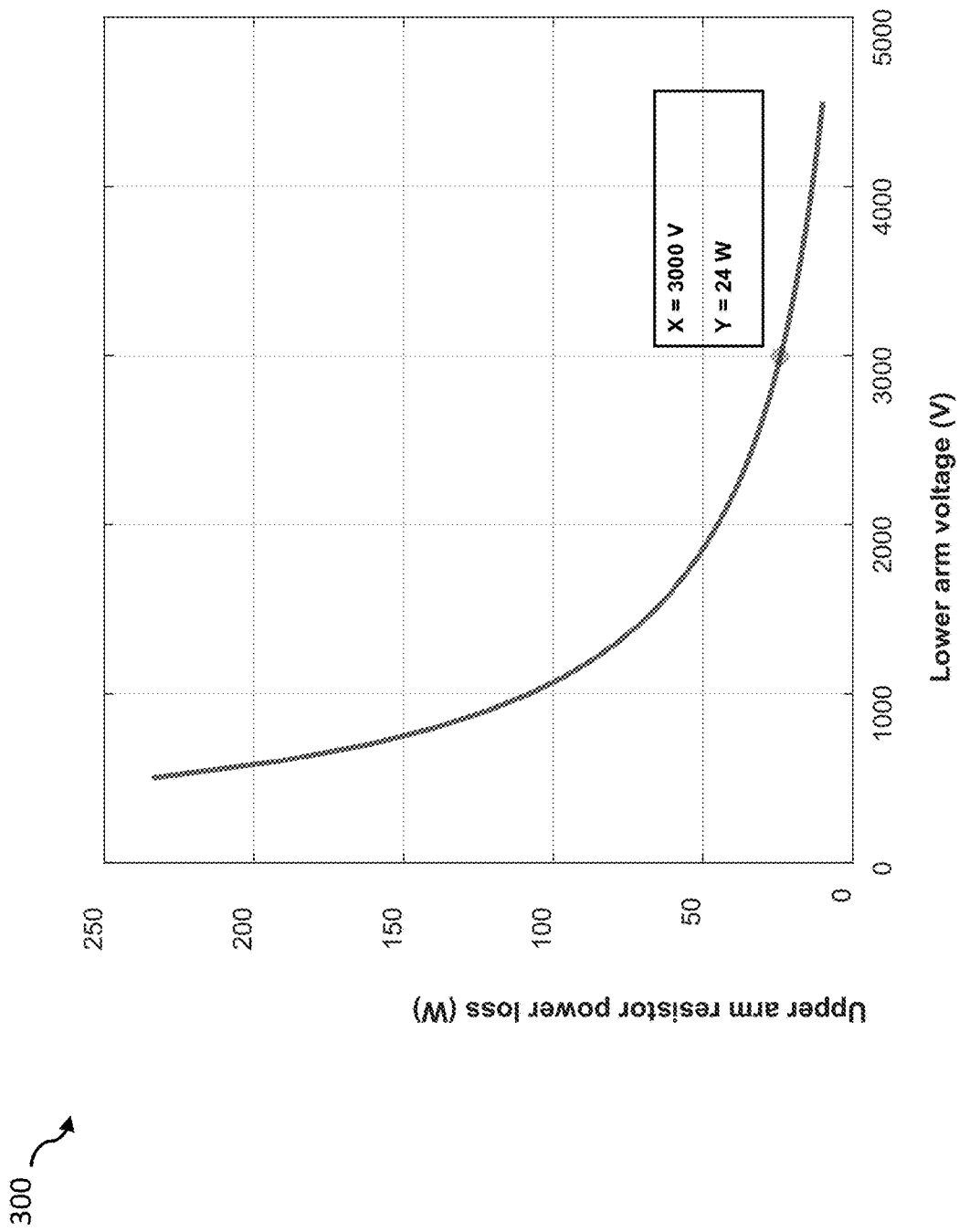
FIG. 3 depicts an exemplary power loss graph in an upper arm relative to a lower arm voltage of an auxiliary power supply.

In some examples, the upper arm resistor $R_{UP}$ can be selected according to $$R_{UP} = \frac{(V_{SM} - V_{LOW})V_{LOW}}{P_{LOW(max)}},$$

wherein $R_{UP}$ is an upper arm resistor's value, $V_{SM}$ is the input voltage (e.g., a converter sub-module DC voltage), $V_{LOW}$ is a lower arm voltage, and $P_{LOW(max)}$ is a maximum total power consumption of an isolated converter circuit 208. The power loss of the upper arm circuit 204 can be reduced significantly as the lower arm voltage increases. For example, as shown in an exemplary graph 300 of FIG. 3, a reduction in power loss at the upper arm circuit 204 can be proportional to an increase in the lower arm voltage. The upper arm's power loss can be calculated according to $$P_{UP} = \frac{V_{SM} - V_{LOW}}{V_{LOW}} P_{LOW},$$

wherein $P_{UP}$ is the upper arm's power loss.

The APS 200 can include an isolated converter circuit 208. In some examples, the isolated converter circuit 208 can correspond to the isolated converter circuit 108, as illustrated in FIG. 1. The isolated converter circuit 208 can include a primary side and a secondary side. The primary side can include a half-bridge circuit 212. In some examples, the half-bridge circuit 212 can include a set of primary side switches, $Q_1$ and $Q_2$ that can be switched (e.g., turned-on and/or turned-off). In a non-limiting example, the set of primary switches $Q_1$ and $Q_2$ can correspond to 4.5 kV, 0.2 A Si MOSFETs. The set of primary side switches $Q_1$ and $Q_2$ can be configured to switch according to a pulse-width modulation (PWM) signal generated by a PWM circuit (not shown in FIG. 2). The PWM signal can have a given frequency (e.g., about 10 kilohertz (kHZ), and a given duty cycle (e.g., about 0.5 duty ratio). In an example, the APS 200 can include a local gate drive circuit 214. In some examples, the local gate drive circuit 214 can include the PWM circuit. In other examples, the PWM circuit can correspond to the local gate drive circuit 214.

In some examples, on the primary side, the isolated converter circuit 208 can include a plurality of capacitors $C_{IN1}$ and $C_{IN2}$. The lower arm voltage $V_{LOW}$ can be established across the capacitors $C_{IN1}$ and $C_{IN2}$ at nodes $V_{LOW+}$ and $V_{LOW-}$. As illustrated in FIG. 2, a given terminal of capacitor $C_{IN1}$ can be coupled to node $V_{LOW+}$ and a given terminal of capacitor $C_{IN2}$ can be coupled to node $V_{LOW-}$ while remaining terminals of the capacitors $C_{IN1}$ and $C_{IN2}$ are coupled to one another. The lower arm voltage $V_{LOW}$ can be established based on the input voltage generated by the $V_{SM}$ and an impedance ratio. The impedance ratio can correspond to a ratio of an impedance between the upper arm circuit 204 and an equivalent impedance. The equivalent impedance can characterize an impedance of the isolated converter circuit 208 and a voltage regulator circuit 210. As such, in some examples, the lower arm voltage $V_{LOW}$ can be maintained to be less than one-half (½) of the input voltage generated by the $V_{SM}$.

The isolated converter circuit 208 can include a transformer 216 to isolate the primary side from the secondary side. In a non-limiting example, the transformer 216 can include a plurality of stacked toroidal cores (e.g., three cores) and a number of turns (e.g., 385:75:75, 500:90:90, etc.). The set of primary side switches, $Q_1$ and $Q_2$, can be configured to provide the lower arm voltage $V_{LOW}$ to the transformer 216 according to the PWM signal (e.g., during an on-state of the PWM signal). The isolated converter circuit 208 can further include a plurality of alternating-current-to-direct-current (AC/DC) converter circuits 218. In some examples, each AC/DC converter circuit 218 can include a rectifier (not shown in FIG. 2). The rectifier can be configured to converter (or rectify) an AC voltage generated by the transformer 216 based on the lower arm voltage $V_{LOW}$ to a DC voltage. In some examples, the isolated converter circuit 208 can include a plurality of DC/DC converter circuits 220. Each DC/DC converter circuit 220 can be configured to convert the DC voltage to a different DC voltage signal that can have a different DC voltage level (e.g., amplitude). For example, each DC/DC converter circuit 220 can be configured to receive a given input DC voltage (e.g., in a range of about 110-450 V), and output a different DC voltage (e.g., about 15 V, about 300V, etc.).

Figure 4:
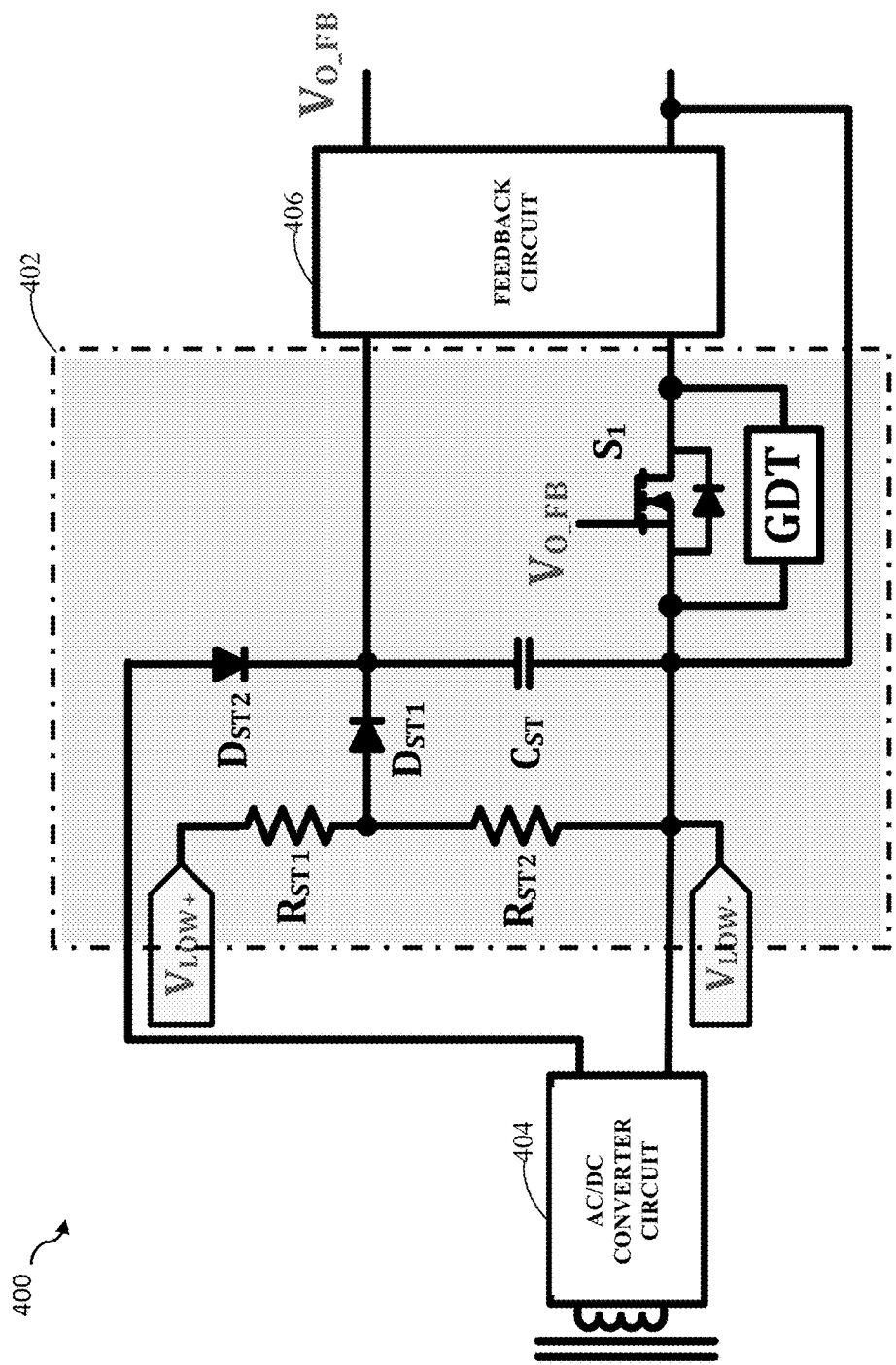
FIG. 4 depicts an exemplary environment that includes an exemplary start-up circuit.

During normal auxiliary power supplies operations, one of the DC/DC converter circuits 220 can be configured to provide all or a portion of the output voltage $V_{out}$ as feedback to keep switching device $S_1$, as illustrated in FIG. 4 continuously in an on-state. Consequently, power can be continuously delivered via an AC/DC converter circuit (e.g., the AC/DC converter circuit 218, as illustrated in FIG. 2 and/or the AC/DC converter circuit 404, as illustrated in FIG. 4) to an associated DC/DC converter circuit (e.g., the DC/DC converter circuit 220, as illustrated in FIG. 2), which can allow the APS to operate in a self-sustainable manner. While operating, a given DC/DC converter circuit 220 and an associated AC/DC converter circuit 218 can be configured to provide the output voltage $V_{out}$. The output voltage $V_{out}$ can be provided to a gate driver, which can be configured to drive the switching device of the MMC system based on the output voltage.

The voltage regulator circuit 210 can further include a sensing circuit (not shown in FIG. 2). The sensing circuit can be configured to sense the lower arm voltage $V_{LOW}$. In an example, the sensed lower arm voltage can be a fraction of the lower arm voltage. The sensing circuit can be configured to provide the sensed lower arm voltage $V_{LOW}$ to a control circuit 224 of the voltage regulator circuit 210. The control circuit 224 can be configured to regulate the lower arm voltage $V_{LOW}$ established across $C_{IN1}$ and $C_{IN2}$ of the isolated converter circuit 208 based on the sensed lower arm voltage to substantially match a lower arm reference voltage, as described herein.

Figure 5:
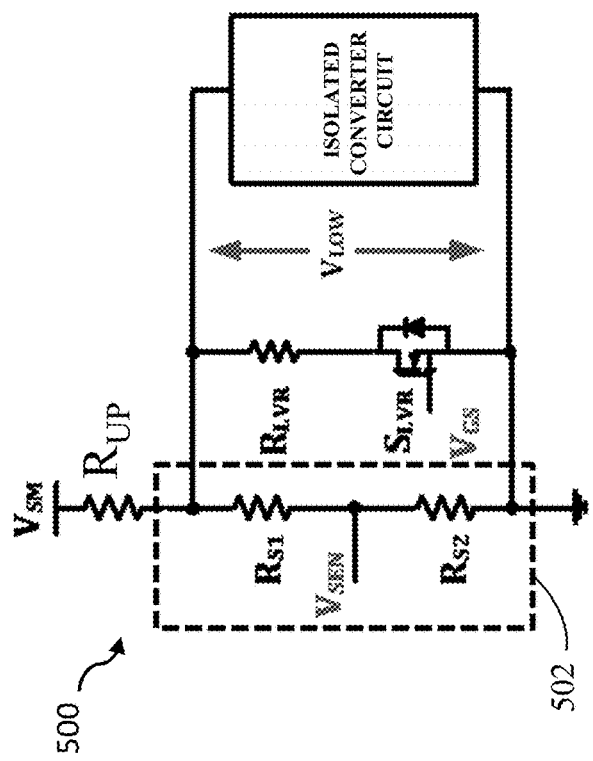
FIG. 5 depicts an exemplary environment that includes an exemplary sensing circuit.

FIG. 5 depicts an exemplary environment 500 that includes an exemplary sensing circuit 502. In some examples, the sensing circuit 502 can correspond to the sensing circuit as described with respect to FIG. 2. The sensing circuit 502 can include a plurality of resistors $R_{S1}$ and $R_{S2}$ that can be connected in series. In a non-limiting example, $R_{S1}$ can have a resistance of about 50 Mega-Ohms (MΩ) and $R_{S2}$ can have a resistance of about 78 kΩ. The sensing circuit 502 can be configured to sense the lower arm voltage $V_{LOW}$. The sensed lower arm voltage can be provided to a control circuit. In some examples, the control circuit can correspond to the control circuit 224, as illustrated in FIG. 2. The control circuit can be configured to regulate the lower arm voltage $V_{LOW}$ based on the sensed lower arm voltage and a lower arm reference voltage. For example, the control circuit can be configured to adjusting a gate voltage $V_{GS}$ of a voltage regulator $S_{LVR}$ based on the sensed lower arm voltage. In an example, the voltage regulator $S_{LVR}$ as illustrated in FIG. 5 can correspond to a voltage regulator $S_{LVR}$, as illustrated in FIG. 2. In some examples, the voltage regulator $S_{LVR}$ can be configured to operate in a linear region to function as an adjustable resistor. In an example, the voltage regulator $S_{LVR}$ can correspond to a MOSFET. For example, if the sensed lower arm voltage is greater than the lower arm reference voltage, the control circuit (e.g., the control circuit 224, as illustrated in FIG. 2) can be configured to increase the voltage regulator's $S_{LVR}$ gate voltage to reduce an impedance of the voltage regulator 210. Reducing the impedance of the voltage regulator 210 can correspond to a reduction in the lower arm voltage $V_{LOW}$. Voltage regulation can be achieved by adjusting a gate voltage of the voltage regulator $S_{LVR}$.

The isolated converter circuit 208 can include a start-up circuit 226. In some examples, one of the D/DC converter circuits 220 can be coupled to the start-up circuit 226, as illustrated in FIG. 2. The start-up circuit 226 can be coupled to nodes $V_{LOW+}$ and $V_{LOW-}$. FIG. 4 illustrates an exemplary environment 400 that includes a start-up circuit 402 for an auxiliary power supply (APS). In some examples, the APS can correspond to the APS 100, as illustrated in FIG. 1, and/or the APS 200, as illustrated in FIG. 2. In an example, the start-up circuit 402 can correspond to the start-up circuit 224, as illustrated in FIG. 2. In an example, the start-up circuit 402 can be coupled to an AC/DC converter circuit 404. In some examples, the AC/DC converter circuit 404 can correspond to one of the AC/DC converter circuits 218, as illustrated in FIG. 2. The start-up circuit 402 can be configured to automatically start-up the APS. The start-up circuit 402 can include a gas discharge tube (GDT). The GDT can be configured as a voltage-triggered switch based on a switching device $S_1$ that is activated according to an output feedback voltage $V_{O\_FB}$.

In some examples, the start-up circuit 402 can be coupled to nodes $V_{LOW+}$ and $V_{LOW-}$, as described with respect to FIG. 2. During start-up of the APS 200, a capacitor $C_{ST}$ can be charged by the lower arm voltage $V_{LOW}$ via resistor network $R_{ST1}$ and $R_{ST2}$. In a non-limiting example, $R_{ST1}$ can have a resistance of about 1.3 MΩ and $R_{ST2}$ can have a resistance of about 15 kΩ. In some examples, the capacitor $C_{ST}$ can include one of a 12 micro-farad capacitor and a 33 micro-farad capacitor. When the $C_{ST}$ voltage is greater than a breakdown voltage of the GDT, the GDT can begin to conduct current, and energy stored in the $C_{ST}$ can be provided to a DC/DC feedback circuit 406. In a non-limiting example, the breakdown voltage of the GDT can be about 350 V. In some examples, the DC/DC feedback circuit 406 can correspond to one of the DC/DC convert circuits 220, as illustrated in FIG. 2. The feedback circuit 406 can be configured to generate a feedback voltage $V_{O\_FB}$. The feedback voltage $V_{O\_FB}$ can be used to power one or more components of one of the voltage regulator circuit 210 and the isolated converter circuit 208. In some examples, the feedback voltage $V_{O\_FB}$ can be used to provide power to a local gate drive circuit and the control circuit 224 along a feedback circuit 228 (e.g., the local gate drive circuit 214, as illustrated in FIG. 2). In an example, the feedback circuit 228 can correspond to the feedback circuit 112, as illustrated in FIG. 1. Accordingly, the feedback voltage $V_{O\_FB}$ can be used to start circuit operation of the APS (e.g., the APS 100, as illustrated in FIG. 1 and/or the APS 200, as illustrated in FIG. 2).

Figure 6:
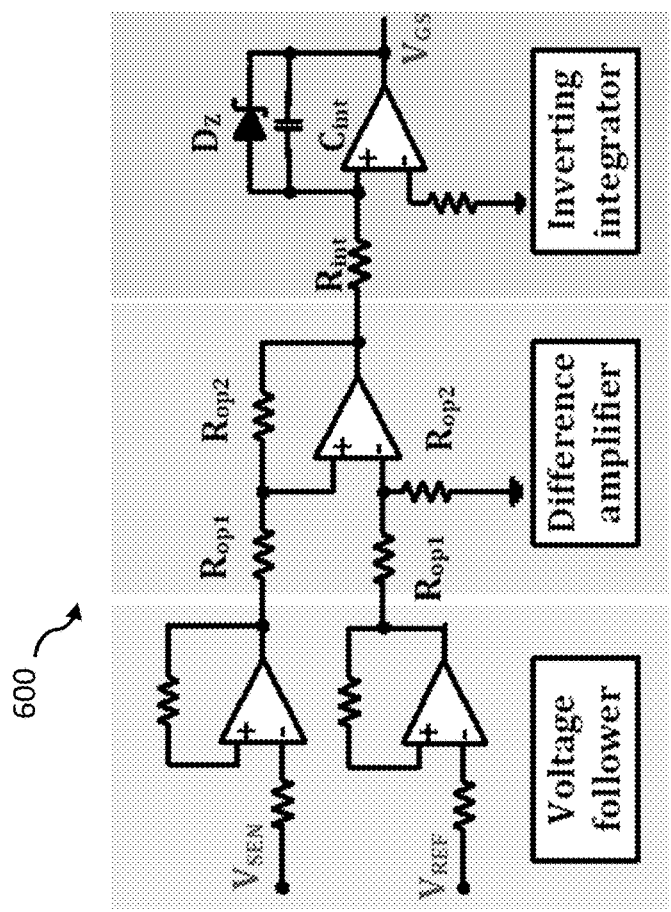
FIG. 6 illustrates an exemplary control circuit according to the systems and methods described herein.

FIG. 6 illustrates an exemplary control circuit 600 according to the systems and methods described herein. In an example, the control circuit 600 can correspond to the control circuit 224, as illustrated in FIG. 2. In some examples, the gate voltage for a voltage regulator (e.g., the voltage regulator $S_{LVR}$, as illustrated in FIGS. 2 and/or 5) can be determined according to $$V_{GS} = \frac{R_{op2}}{R_{op1}(R_{int}C_{int})} \int (V_{SEN} - V_{REF})dt,$$

wherein $V_{GS}$ is the gate voltage for the voltage regulator $S_{LVR}$, $R_{op1}$ and $R_{op2}$, respectively, is a resistance of corresponding resistors of a difference amplifier, as illustrated in FIG. 6, and $C_{int}$ is a capacitance of a feedback capacitor of an inverting integrator, as illustrated in FIG. 6. In some examples, a regulation range for a voltage regulator circuit (e.g., the voltage regulator circuit 210, as illustrated in FIG. 2) can be based on a resistance value of a voltage range resistor $R_{LVR}$, as illustrated in FIGS. 2 and 5. The $R_{LVR}$ value can be determined according to $$R_{LVR} = \frac{V_{LOW}}{V_{SM} - V_{LOW}} R_{UP}.$$

The voltage regulator circuit can further include a diode $D_Z$. In some examples, the diode $D_Z$ can correspond to a 7.5 V Zener diode. The diode $D_Z$ can be configured relative to the voltage regulator $S_{LVR}$ such that the APS is operating within specified conditions (e.g., within a safe operating range). In a non-limiting example, the voltage regulator $S_{LVR}$ can correspond to a 4.5 kV Si MOSFET.

According to the examples described herein, a voltage regulator circuit 210 can be configured to regulate the lower arm voltage $V_{LOW}$ across $C_{IN1}$ and $C_{IN2}$ of the isolated converter circuit 208 based on the sensed lower arm voltage. The voltage regulator circuit 210 can be configured to adjust the lower arm voltage $V_{LOW}$ based on gate drive power variations associated resulting from changes in operating conditions of the high voltage system. For example, the voltage regulator circuit 210 can be configured to adjust the lower arm voltage in response to changes in operating conditions of the MMC system (e.g., gate drive power variations). A change in an operating condition of the MMC system can cause a change in the impedance of the isolated converter circuit 208. Changes in impedance of the isolated converter circuit 208 can be correlated with changes in the operating condition of the MMC system. The lower arm voltage can provide an indication of impedance change in the isolated converter circuit 208. For example, an increase in the lower arm voltage $V_{LOW}$ can correspond to an increase in impedance of the isolated converter circuit 208. In another example, a decrease in the lower arm voltage $V_{LOW}$ can correspond to a decrease in impedance of the isolated converter circuit 208. Accordingly, the lower arm voltage $V_{LOW}$ can be regulated to stabilize the APS 200 to provide a stable output voltage $V_{out}$ at the output terminal 202. The output voltage $V_{out}$ can be supplied to a gate driver to drive an associated switching device of the MMC system.

Figure 7:
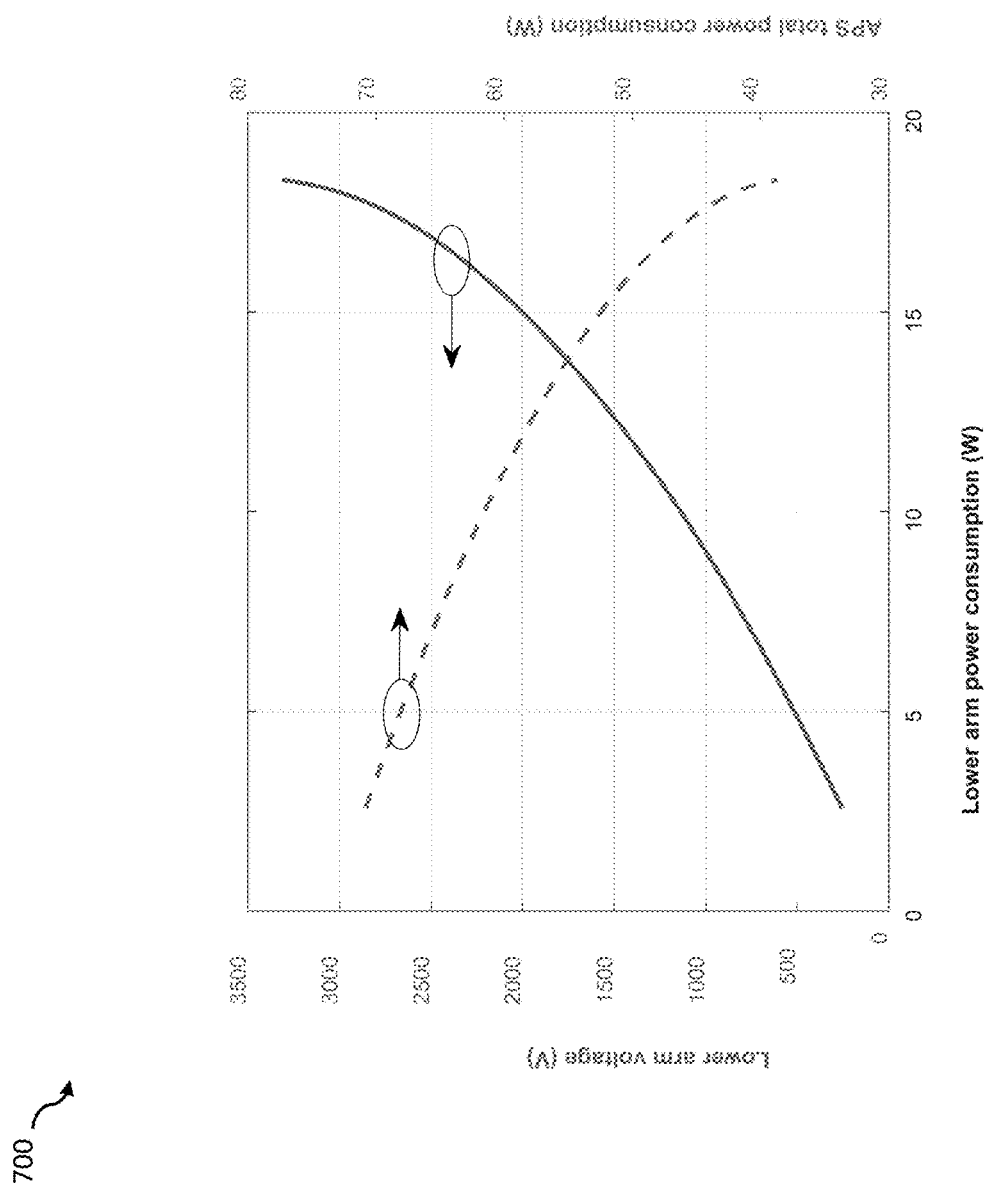
FIG. 7 depicts an exemplary graph of effects in lower arm power variations in an auxiliary power supply.

FIG. 7 illustrates an exemplary graph 700 illustrating the effects of lower arm power variations. In FIG. 7, it can be assumed that the sub-module voltage (e.g., switching device voltage) is about 7 kV and that an upper arm resistor is about 666.7 kΩ. It can be seen from FIG. 7 that the lower arm voltage can be fixed at a voltage level corresponding to a maximum lower arm power consumption. Consequently, the lower arm voltage can be stable and an auxiliary power supply as described herein can have a reduced total power consumption.

What have been described above are examples. It is, of course, not possible to describe every conceivable combination of components or methods, but one of ordinary skill in the art will recognize that many further combinations and permutations are possible. Accordingly, the disclosure is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. An auxiliary power supply (APS) comprising:
   an upper arm circuit having an upper arm circuit impedance;
   a lower arm circuit comprising an isolated converter circuit and a voltage regulator circuit each having a respective impedance;
   wherein the isolated converter circuit is configured to generate an output voltage based on a lower arm voltage for a gate drive circuit, the lower arm voltage being generated based on an input voltage applied to the upper arm circuit and the lower arm circuit; and
   wherein the voltage regulator circuit is configured to regulate a voltage level of the lower arm voltage based on an impedance ratio between the upper arm circuit impedance and an equivalent impedance of the lower arm circuit to substantially match a voltage level of a lower arm reference voltage.

2. The APS of claim 1, wherein the lower arm voltage is controlled to provide a stable output voltage at an output of the APS, wherein the stable output voltage is used by the gate drive circuit to drive an associated switching device.

3. The APS of claim 2, wherein the upper arm circuit and the lower arm circuit are connected in series.

4. The APS of claim 2, wherein the voltage regulator circuit comprises a voltage sensing circuit configured to sense the lower arm voltage to generate a sensed lower arm voltage, wherein the sensed lower arm voltage is a fraction of the lower arm voltage.

5. The APS of claim 4, wherein the sensed lower arm voltage can be representative of the impedance ratio between the upper arm circuit impedance and the equivalent impedance of the lower arm circuit.

6. The APS of claim 5, wherein the voltage regulator circuit is configured to regulate the voltage level of the lower arm voltage based on the sensed lower arm voltage to substantially match the voltage level of the lower arm reference voltage.

7. The APS of claim 6, wherein an increase in the lower arm voltage can correspond to an increase in the impedance of a lower arm isolated DC/DC circuit.

8. The APS of claim 6, wherein a decrease in the lower arm voltage can correspond to a decrease in the impedance of a lower arm isolated DC/DC circuit.

9. The APS of claim 6, wherein the voltage regulator is further configured to compare the sensed lower arm voltage relative to the lower arm reference voltage, and further configured to regulate the voltage level of the lower arm voltage based on a result of the comparison.

10. The APS of claim 1, wherein the upper arm circuit comprises at least one passive device, wherein the upper arm circuit impedance is based on the at least one passive device.

11. The APS of claim 10, wherein the at least one passive device comprises one of a resistor, a capacitor, and a combination thereof.

12. The APS of claim 1, wherein the upper arm circuit comprises an upper arm resistor, wherein the upper arm resistor is selected according to $$R_{UP} = \frac{(V_{SM} - V_{LOW})V_{LOW}}{P_{LOW(max)}},$$

wherein $R_{up}$ is an upper arm resistor's value, $V_{SM}$ is the input voltage, $V_{LOW}$ is the lower arm voltage, and $P_{LOW(max)}$ is a maximum total power consumption of a lower arm isolated DC/DC circuit.

13. The APS of claim 1, wherein the voltage regulator circuit comprises a resistor defining a regulation range for the voltage regulator circuit.

14. An auxiliary power system (APS) comprising:
an upper arm circuit having an upper arm circuit impedance; and
a lower arm circuit having a lower arm circuit impedance and connected in series with the upper arm circuit, the lower arm circuit being configured to generate an output voltage based on a lower arm voltage, the lower arm voltage being generated based on an input voltage applied to the upper arm circuit and the lower arm circuit, wherein the lower arm voltage is regulated based on an impedance ratio between the upper arm circuit impedance and the lower arm circuit impedance to substantially match a voltage level of a lower arm reference voltage.

15. The APS of claim 14, wherein the lower arm circuit comprises an isolated converter circuit and a voltage regulator circuit, the lower arm circuit impedance corresponding to an equivalent impedance of the isolated converter circuit and the voltage regulator circuit.

16. The APS of claim 14, wherein the output voltage corresponds to a plurality of output voltages, wherein each output voltage is generated at an output node to which a gate driver is coupled, the gate driver being configured to drive a switching device based on a respective output voltage.

17. The APS of claim 14, wherein a voltage regulator circuit comprises a voltage sensing circuit configured to sense the lower arm voltage to generate a sensed lower arm voltage, wherein the sensed lower arm voltage is a fraction of the lower arm voltage.

18. The APS of claim 17, wherein the voltage regulator is further configured to compare the sensed lower arm voltage relative to the lower arm reference voltage, and further configured to regulate the voltage level of the lower arm voltage based on a result of the comparison.

19. The APS of claim 14, wherein the upper arm circuit impedance corresponds to a fixed impedance.

20. The APS of claim 19, wherein the lower arm circuit impedance varies according to one or more parameters of a high voltage system.

* * * * *

UNITED STATES PATENT AND TRADEMARK OFFICE
CERTIFICATE OF CORRECTION

PATENT NO. : 10,530,236 B2
APPLICATION NO. : 16/131630
DATED : January 7, 2020
INVENTOR(S) : Jin Wang, Boxue Hu and He Li Page 1 of 1

It is certified that error appears in the above-identified patent and that said Letters Patent is hereby corrected as shown below:

In the Specification

After "CROSS REFERENCE OF RELATED APPLICATION" and before "TECHNICAL FIELD", insert the new paragraph as follows:
--GOVERNMENT SPONSORSHIP
This invention was made with government support under grant/contract number DE-EE0006521 awarded by the Department of Energy. The government has certain rights in the invention.--

Signed and Sealed this
First Day of July, 2025

Coke Morgan Stewart
*Acting Director of the United States Patent and Trademark Office*